United States Patent [19]

Raue et al.

[11] Patent Number: 4,869,989
[45] Date of Patent: Sep. 26, 1989

[54] DRY TONERS CONTAINING FANAL PIGMENTS BASED ON CATIONIC DYES

[75] Inventors: Roderich Raue; Hubertus Psaar, both of Leverkusen, Fed. Rep. of Germany

[73] Assignee: Bayer Aktiengesellschaft, Leverkusen, Fed. Rep. of Germany

[21] Appl. No.: 180,418

[22] Filed: Apr. 12, 1988

[30] Foreign Application Priority Data

Apr. 29, 1987 [DE] Fed. Rep. of Germany ....... 3714288

[51] Int. Cl.$^4$ .......................... G03G 9/10; G03G 9/08
[52] U.S. Cl. ..................................... 430/106; 430/110
[58] Field of Search ............................... 430/106, 110

[56] References Cited

U.S. PATENT DOCUMENTS 3,985,559 10/1976 Peters .................................. 430/106
4,301,227 11/1981 Hotta et al. ......................... 430/106

FOREIGN PATENT DOCUMENTS 53-29132 3/1978 Japan .................................... 430/106
61-156139 7/1986 Japan .................................... 430/110
61-278867 12/1986 Japan .................................... 430/106

Primary Examiner—Roland E. Martin
Attorney, Agent, or Firm—Sprung Horn Kramer & Woods

[57] ABSTRACT

A dry toner for developing latent electrostatic images in electrostatic recording and printing methods contains, as charge-control substance, a pigment of the formula

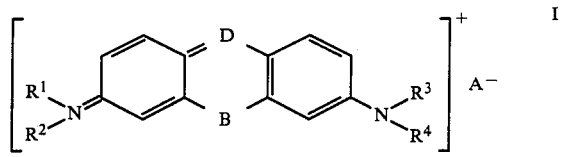

in which
A$^-$ represents an anion of a heteropolyacid based on tungsten and/or molybdenum with phosphorus, vanadium, cobalt, aluminium, manganese, chromium and/or nickel or a copper(I) hexacyanoferrate anion,
R$^1$ and R$^3$, independently of one another, represent hydrogen, alkyl or aralkyl,
R$^2$ and R$^4$, independently of one another, represent hydrogen, alkyl, aralkyl or aryl, or
R$^1$, R$^2$, R$^3$ and R$^4$, independently of one another, through linking to the o-position of the benzene ring, represent members of a five- or six-membered ring, or
R$^1$ and R$^2$ or R$^3$ and R$^4$ together represent members of a five- or six-membered ring,
B represents oxygen or N-R,
R represents hydrogen, alkyl or aryl and
D represents CH or C-CN, in which the two benzene rings may be fused to a further benzene ring and then hydrogen can also replace NR$^3$R$^4$ and D can also denote N, and in which the cyclic and acyclic radicals and the benzene rings may be substituted by nonionic radicals which are conventional in dyestuffs chemistry.

6 Claims, No Drawings

DRY TONERS CONTAINING FANAL PIGMENTS BASED ON CATIONIC DYES

The invention relates to a dry toner for developing latent electrostatic images in electrostatic recording and printing methods, which contains, as charge-control substance, a pigment of the formula

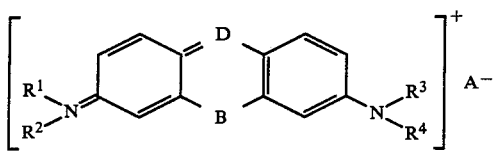

in which
- $A^-$ represents an anion of a heteropolyacid based on tungsten and/or molybdenum with phosphorus, vanadium, cobalt, aluminium, manganese, chromium and/or nickel or a copper(I) hexacyanoferrate anion,
- $R^1$ and $R^3$, independently of one another, represent hydrogen, alkyl or aralkyl,
- $R^2$ and $R^4$, independently of one another, represent hydrogen, alkyl, aralkyl or aryl, or
- $R^1$, $R^2$, $R^3$ and $R^4$, independently of one another, through linking to the o-position of the benzene ring, represent members of a five- or six-membered ring, or
- $R^1$ and $R^2$ or $R^3$ and $R^4$ together represent members of a five- or six-membered ring,
- B represents oxygen or N-R,
- R represents hydrogen, alkyl or aryl and
- D represents CH or C-CN, in which the two benzene rings may be fused to a further benzene ring and then hydrogen can also replace $NR^3R^4$ and D can also denote N, and in which the cyclic and acyclic radicals and the benzene rings may be substituted by nonionic radicals which are conventional in dyestuffs chemistry.

Examples of nonionic groups are halogen, hydroxyl, alkoxy, alkenyloxy, aryloxy, aralkoxy, cycloalkyloxy, heteryloxy, aryl, heteryl, alkylmercapto, arylmercapto, aralkylmercapto, alkylsulphonyl, arylsulphonyl, cyano, carbamoyl, alkoxycarbonyl, amino which may be substituted by 1 or 2 alkyl, cycloalkyl, aryl or aralkyl groups, acylamino, alkylcarbonyloxy and arylcarbonyloxy, and in addition, as substituents of the rings, alkyl, aryl, aralkyl, nitro, alkenyl or arylvinyl.

Alkyl represents $C_1$- to $C_{30}$-alkyl, in particular $C_1$- to $C_{12}$-alkyl.

The alkyl radicals and the alkyl radicals in alkoxy, alkylthio, alkylamino, alkanoylamino, alkylsulphonyl and alkoxycarbonyl groups may be branched and may be substituted, for example, by fluorine, chlorine, $C_1$- to $C_4$-alkoxy, cyano or $C_1$- to $C_4$-alkoxycarbonyl.

In particular, aralkyl is phenyl-$C_1$- to $C_4$-alkyl which may be substituted in the phenyl ring by halogen, $C_1$- to $C_4$-alkyl and/or $C_1$- to $C_4$-alkoxy, preferably benzyl.

In particular, cycloalkyl is cyclopentyl or cyclohexyl, each of which is optionally substituted by methyl.

In particular, alkenyl is $C_2$- to $C_5$-alkeynyl which may be monosubstituted by hydroxyl, $C_1$- to $C_4$-alkoxy, cyano, $C_1$- to $C_4$-alkoxycarbonyl, chlorine or bromine. Vinyl and allyl are preferred.

In particular, halogen is fluorine, chlorine and bromine, preferably chlorine.

In particular, aryl is phenyl or naphthyl, each of which is optionally substituted by 1 to 3 $C_1$- to $C_4$-alkyl, chlorine, bromine, cyano, $C_1$- to $C_4$-alkoxycarbonyl or $C_1$- to $C_4$-alkoxy.

In particular, alkoxy is $C_1$- to $C_{12}$-alkoxy which is optionally substituted by chlorine or $C_1$- to $C_4$-alkoxy.

In particular, acyl is $C_1$- to $C_4$-alkylcarbonyl and $C_1$- to $C_4$-alkoxycarbonyl, or aminocarbonyl or aminosulphonyl which is optionally monosubstituted or disubstituted by $C_1$- to $C_4$-alkyl, phenyl or benzyl.

In particular, alkoxycarbonyl is $C_1$- to $C_4$-alkoxycarbonyl which is optionally substituted by hydroxyl, halogen or cyano.

In particular, heteryl is pyridyl, pyrimidyl, pyrazinyl, triazinyl, indolyl, imidazolyl, oxazolyl, thiazolyl triazolyl, thiadiazolyl or tetrazolyl, each of which may be benzene-fused, and their partly hydrogenated or fully hydrogenated derivatives.

Preferred nonionic substituents of the rings are $C_1$- to $C_4$-alkyl, $C_1$- to $C_4$-alkoxy, cyano, nitro and halogen.

Together with the nitrogen atom to which they are bound, the substituents $R^1$ and $R^2$ or $R^3$ and $R^4$ can form, for example, a piperidine, piperazine or morpholine ring which is optionally substituted by 1 to 4 $C_1$–$C_4$-alkyl groups.

Linking of substituents $R^1$, $R^2$, $R^3$ or $R^4$ with the o-position of the benzene ring, together with the nitrogen atom to which they are bonded and the benzene ring produces, for example, a dihydrobenzooxazine, tetrahydroquinoline or indoline ring, each of which may be substituted by 1 to 4 $C_1$–$C_4$-alkyl groups.

A preferred group amongst the abovementioned compounds corresponds to the general formula

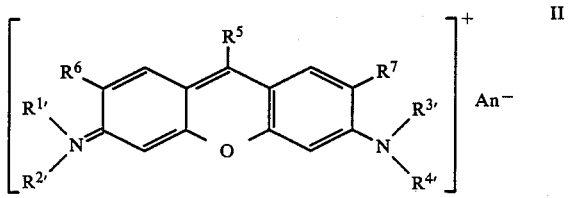

in which $R^{1'}$ and $R^{3'}$, independently of one another, represent hydrogen or a $C_1$- to $C_4$-alkyl radical which is optionally substituted by chlorine, cyano, hydroxyl, $C_1$- to $C_3$-alkylcarbonyloxy or $C_1$- to $C_4$-alkoxy, or a benzyl radical, $R^{2'}$ and $R^{4'}$, independently of one another, represent the substituents mentioned in the case of $R^{1'}$ and $R^{3'}$ or a phenyl radical which is optionally substituted by methyl, chlorine or $C_1$- to $C_4$-alkoxy, $R^5$ represents hydrogen or cyano, $R^6$ and $R^7$, independently of one another, represent hydrogen, methyl or $C_1$- to $C_4$-alkoxy, and $An^-$ represents the anion of a heteropolyacid based on phosphorus, molybdenum and/or tungsten.

A further preferred group of pigments corresponds to the formula

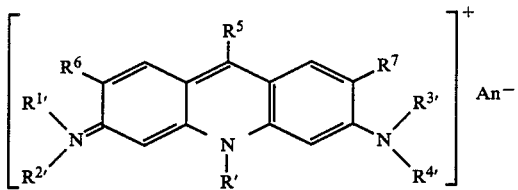

in which
R' represents hydrogen, methyl, ethyl or a phenyl radical which is optionally substituted by methyl, chlorine or $C_1$- to $C_4$-alkoxy, and
$R^{1'}$, $R^{2'}$, $R^{3'}$, $R^{4'}$, $R^5$, $R^6$, $R^7$ and $An^-$ have the abovementioned meaning.

A further preferred group of compounds of the general formula I corresponds to the formula

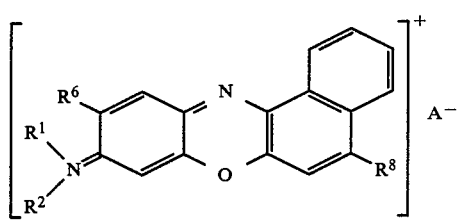

in which
$R^8$ represents hydrogen or the

group, and
$R^1$, $R^2$, $R^3$, $R^4$, $R^6$ and $A^-$ have the abovementioned meaning.

Of these compounds, those are in turn preferred in which
$R^1$ to $R^4$ are replaced by the $R^{1'}$ to $R^{4'}$ radicals and $A^-$ is replaced by $An^-$ anion.

Amongst the substituents mentioned in the formulae of II to IV, the following are of particular importance:
R' hydrogen, methyl, ethyl and phenyl,
$R^{1'}$ to $R^{4'}$ hydrogen, methyl and ethyl,
$R^5$ hydrogen, and
$R^6$ and $R^7$ hydrogen and methyl.

Of the anions $An^-$, phosphorus molybdate, phosphorus tungstate and phosphorus tungstomolybdate are particularly preferred.

Dry toners used for developing latent electrostatic images in electrophotography or in electrostatic recording and printing methods generally contain binder resins, charge-control substances and colorants, such as pigments or soluble dyestuffs. Suitable binder resins are, for example, styrene, epoxy, phenolic, maleic and polyamide resins.

Styrene resins are, for example, styrene homopolymers or styrene copolymers with methacrylates, acrylates, chlorostyrene, α-methylstyrene, vinyl chloride or vinyl acetate.

Polycondensation resins are obtained from di- or polycarboxylic acids, such as terephthalic acid, trimellitic acid, maleic acid, fumaric acid and polyhydroxy compounds, such as 2,2-bis-(hydroxyphenyl)-propane.

The preferred weight ratio of pigment of the formula (I) to resin is 0.1 to 15, in particular 0.1 to 5, to 100 parts.

Suitable colorants are, for example, Benzidine Yellow, and phthalocyanine, quinacridone and perylene pigments.

The preferred weight ratio of colorant to resin is 1 to 20:100 parts.

The dry toners according to the invention can be produced, for example, by mixing the components in a mixer and subsequently powdering the mixture.

For production of a dry developer, the toner obtained is mixed with a carrier, for example iron powder, which can also have a coating, or with glass beads, and exhibits a strong positive chargeability compared to the carrier.

Some pigments of the formula (I) are known. They have hitherto been employed for the production of liquid electrophoretic toner dispersions which are used for developing charge on zinc oxide-coated papers. This process is not applicable in modern duplicators.

The charge-control substances employed hitherto in dry toners have been dye bases. Nirgosine dye bases exhibit the disadvantage that their charging properties vary between individual production batches. Other dye bases give an unstable charge if the temperature and humidity conditions vary.

The charge-control pigments according to the invention do not have these disadvantages and give a stable charge, which makes possible the production of perfect copies even in a long-term test. They exhibit a broad range of colour shades, so that they are especially suitable for the production of coloured toners.

The charge-control substances are also suitable for the production of black toners if they are employed in combination with carbon black.

EXAMPLE 1

Preparation of the phosphorus tungstomolybdate solution 15 g of sodium hydroxide are dissolved in 2,500 ml of water, the solution is heated to 90° C., and 527.5 g of sodium tungstate+2 $H_2O$, 50 g of molybdenum(VI) oxide and 63 g of disodium hydrogen phosphate are added. 49 g of concentrated hydrochloric acid and subsequently 94.5 g of 38% strength sodium bisulphite solution are added dropwise to the resultant solution. $SO_2$ is expelled by refluxing the mixture for 30 minutes, and the resultant solution is employed for precipitation of the dyestuffs.

Preparation of the pigment 12 g of the cationic dyestuff of the formula

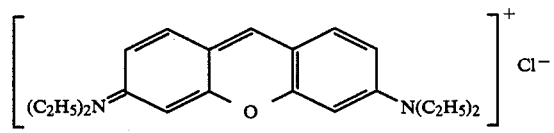

are dissolved in 350 ml of water at 85° C. 120 g sodium phosphorus tungstomolybdate solution whose preparation is described above are added dropwise at 90° C. The suspension is stirred for a further 10 minutes at 90° C. and cooled to room temperature, and the red pigment is filtered off under suction. After drying in vacuo at 50° C., a yield of 19.6 g is obtained.

Preparation of the toner 100 g of styrene/n-butyl methacrylate copolymer (molecular weight 50,000) and 5 g of the phosphorus tungstomolybdate pigment whose preparation is described above are mixed homogeneously in a mixer. After cooling, the resin is powdered in a jet mill to an average grain fineness of 12 μm. 5 g of this toner powder are charged by rotation with 95 g of a carrier material made from iron with a polymer coating, and the charge is determined by the blow-off method. It is 9.2 μC/g and is still unchanged at the same high level after 10,000 copies.

If the dyestuff of the above formula is replaced by the dyestuff which, in place of the ethyl groups, carries methyl groups on the nitrogen, and the process is otherwise carried out in the same way, a toner powder having an equally very good triboelectric charge is obtained.

EXAMPLE 2

30 g of the cationic dyestuff of the formula

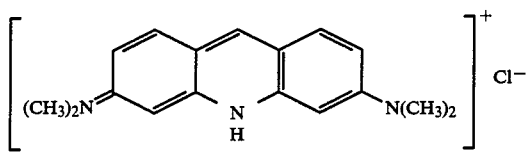

are dissolved in 1.3 liters of water at 90° C., and 325 g of the sodium phosphorus tungstomolybdate solution whose preparation is described in Example 1 are added dropwise. The mixture is stirred for a further 10 minutes at 90° C., and the pigment is filtered off under suction while hot, washed with water and dried in vacuo. Yield: 46.9 g.

An orange toner powder is prepared according to the method of Example 1 and the triboelectric charge is determined by the blow-off method. It is 10.3 μC/g.

An equally good toner powder is obtained when the cationic dyestuff above is replaced by a dyestuff which is substituted by ethyl groups on the two nitrogen atoms.

Further suitable pigments proceed from the dyestuffs of the following formulae:

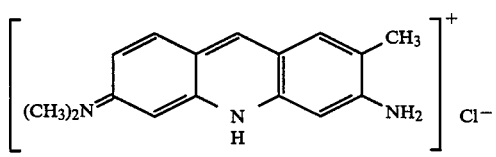

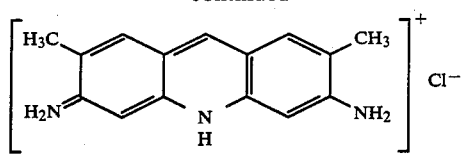

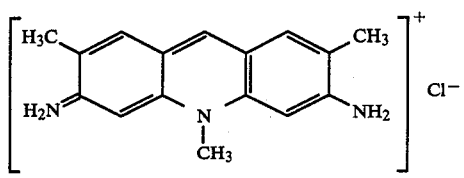

EXAMPLE 3

12 g of the dyestuff of the formula

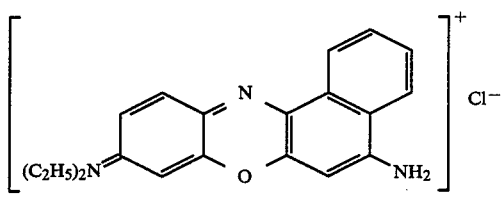

are dissolved in 350 ml of water at 85° C., 120 g of sodium phosphorus tungstomolybdate solution whose preparation is described in Example 1 are added, the mixture is stirred for 10 minutes at 90° C., and the suspension of the pigment is cooled to room temperature and dried in vacuo at 50° C. Yield: 13.9 g.

A blue toner powder is prepared by the method of Example 1 and the triboelectric charge is determined by the blow-off method. It is 8.6 μC/g and is unchanged at the same high level after 10,000 copies.

A dyestuff of the above formula which carries hydrogen in place of the amino group in the naphthalene ring system can be precipitated to form a violet pigment and processed into a toner powder which likewise exhibits a good triboelectric charge.

A toner powder having a good triboelectric charge is also obtained when proceeding from the dyestuff of the formula

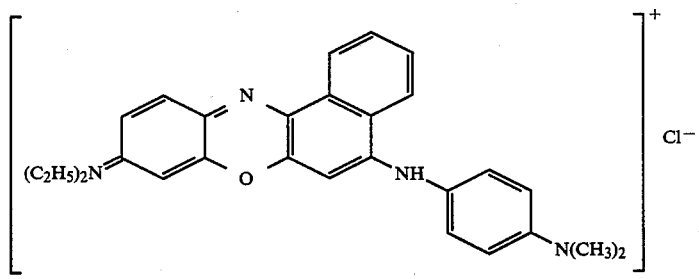

We claim:

1. A positively chargeable toner powder for electrostatic recording and printing methods, which comprises a binder resin and as a charge-control substance, a pigment of the general formula

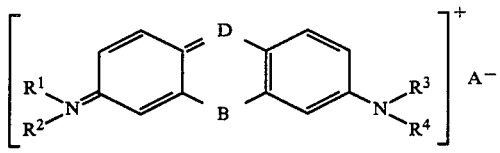

in which
A⁻ is an anion of a heteropolyacid based on tungsten and/or molybdenum with phosphorus, vanadium, cobalt, aluminium, manganese, chromium and/or nickel or a copper(I) hexacyanoferrate anion, $R^1$ and $R^3$, independently of one another, are hydrogen, alkyl or aralkyl, $R^2$ and $R^4$, independently of one another, are hydrogen, alkyl, aralkyl or aryl, or $R^1$, $R^2$, $R^3$ and $R^4$, independently of one another, through linking to the o-position of the benzene ring, are members of a five- or six-membered ring, or $R^1$ and $R^2$ or $R^3$ and $R^4$ together are members of a five- or six-membered ring, B is oxygen or N-R, R is hydrogen, alkyl or aryl and D is CH or C-CN, in which the two benzene rings may be fused to a further benzene ring and then hydrogen can also replace $NR^3R^4$ and D can also denote N, and in which the cyclic and acyclic radicals and the benzene rings may be substituted by nonionic radicals which are conventional in dyestuffs chemistry.

2. A positively chargeable dry toner according to claim 1, which comprises, as a charge-control substance, a pigment of the general formula

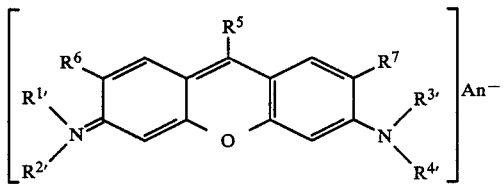

in which
$R^{1'}$ and $R^{3'}$, independently of one another, are hydrogen or a $C_1$- to $C_4$-alkyl radical which is unsubstituted or substituted by chlorine, cyano, hydroxy, $C_1$- to $C_3$-alkylcarbonyloxy or $C_1$- to $C_4$-alkoxy, or a benzyl radical, $R^{2'}$ and $R^{4'}$, independently of one another, are the substituents mentioned in the case of $R^{1'}$ and $R^{3'}$ or a phenyl radical which is unsubstituted or substituted by methyl, chlorine or $C_1$- to $C_4$-alkoxy, $R^5$ is hydrogen or cyano, $R^6$ and $R^7$, independently of one another, are hydrogen, methyl or $C_1$- to $C_4$-alkoxy, and An⁻ is an anion of a heteropolyacid based on phosphorus, molybdenum and/or tungsten.

3. A positively chargeable dry toner according to claim 1, which comprises as a charge-control substance, a pigment of the general formula

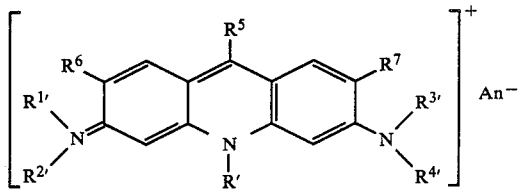

in which
R' is hydrogen, methyl, ethyl or a phenyl radical which is unsubstituted or substituted by methyl, chlorine or $C_1$- to $C_4$-alkoxy, and $R^{1'}$ to $R^{4'}$, $R^5$ to $R^7$ and An⁻ have the meanings given in claim 2.

4. A positively, chargeable dry toner according to claim 1, which contains, as a charge-control substance, a pigment of the general formula in which
$R^{8'}$ is H or $NR^{3'}R^{4'}$, and
$R^{1'}$ to $R^{4'}$, $R^6$ and An⁻ have the meanings given in claim 2.

5. A positively chargeable dry toner according to claim 2 in whose formulae
R' is hydrogen, methyl, ethyl or phenyl,
$R^{1'}$ to $R^{4'}$ are hydrogen, methyl or ethyl,
$R^5$ is hydrogen,
$R^6$ and $R^7$ are hydrogen or methyl,
$R^{8'}$ is hydrogen or $NR^{3'}R^{4'}$, and
An⁻ is phosphorus molybdate, phosphorus tungstate or phosphorus tungstomolybdate.

6. A positively chargeable dry toner according to claim 1, which contains, as a binder resin, a styrene/butylacrylate copolymer.

* * * * *